United States Patent
Bird et al.

(10) Patent No.: US 10,031,749 B2
(45) Date of Patent: Jul. 24, 2018

(54) CREATION OF A HELP FILE

(75) Inventors: Colin L. Bird, Hampshire (GB);
Amanda E. Chessell, Hants (GB);
Fazleabbas Kanji, Middlesex (GB);
Kate Shepherd, Hampshire (GB);
Simen Svennebye, Glasgow (GB);
William Thompson, Oxfordshire (GB);
Kamorudeen L. Yusuf, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/172,197

(22) Filed: Jul. 11, 2008

(65) Prior Publication Data
US 2009/0077502 A1   Mar. 19, 2009

(51) Int. Cl.
*G06F 8/74* (2018.01)
*G06F 9/451* (2018.01)

(52) U.S. Cl.
CPC ............. *G06F 8/74* (2013.01); *G06F 9/453* (2018.02)

(58) Field of Classification Search
CPC ............................. G06F 9/4446; G06F 8/74
USPC ........................................................ 715/705
See application file for complete search history.

(56) References Cited

U.S. PATENT DOCUMENTS

| | | | | |
|---|---|---|---|---|
| 6,597,314 | B1 * | 7/2003 | Beezer | G06F 3/04883 715/812 |
| 7,024,658 | B1 * | 4/2006 | Cohen et al. | 717/117 |
| 8,103,651 | B2 * | 1/2012 | Campbell et al. | 707/709 |
| 2001/0017632 | A1 * | 8/2001 | Goren-Bar | G06F 9/451 715/744 |
| 2002/0015056 | A1 * | 2/2002 | Weinlaender | G06F 9/453 715/705 |
| 2002/0091990 | A1 * | 7/2002 | Little | G06F 8/10 717/105 |
| 2004/0036715 | A1 * | 2/2004 | Warren | G06F 9/453 715/713 |
| 2006/0288017 | A1 * | 12/2006 | Goetz | G06F 17/248 |
| 2007/0136667 | A1 * | 6/2007 | Gerhart | G06F 9/453 715/705 |

* cited by examiner

*Primary Examiner* — Sherrod Keaton
(74) *Attorney, Agent, or Firm* — Kali Law Group, P.C.

(57) ABSTRACT

Methods of generating a help files are presented including: accessing a user model, where the user model defines a number of objects and a number of relationships between the number of objects; selecting an object of the user model; receiving a text file corresponding with the object; creating a component of the help file from the text file; selecting an additional object of the user model, the additional object having a relationship with the object, the relationship corresponding with the number of relationships; and creating an additional component of the help file corresponding with the additional object. In some embodiments, methods further include: detecting a change to the user model; and regenerating the help file to incorporate the change. In some embodiments, methods are presented where the additional component includes: a link to the additional object, and a link to a respective text file of the additional object.

24 Claims, 6 Drawing Sheets

CREATION OF A HELP FILE

PRIORITY CLAIM TO FOREIGN APPLICATION

A claim for priority is hereby made under the provisions of 35 U.S.C. § 119 for the present application based upon Great Britain Patent Application No. 07116589.8, filed on Sep. 17, 2007, which is incorporated herein by reference.

BACKGROUND

The present invention relates to a method of and system for generating a help file.

In a computing environment such as a standard desktop office set-up, in which a user will access applications run on an operating system on a desktop personal computer (PC), it is common for assistance to be provided to the user through the application that they are currently using. This is typically provided via the use of help files. An application, such as Adobe Acrobat Reader, which is used to view flies with the .pdf extension, provides a menu option entitled "Help", which a user can access to obtain assistance in relation to the functions of the application. Such a help function will allow a user to either search by the use of user-chosen keywords, or will provide a series of help pages that are arranged in a logical manner for the user to look through.

Some provision of help functions involve connecting the user remotely to a service that has additional information, which has the advantage of being readily updateable by the application provider, and not tied to the help information stored within the application when it is first sold to the end-user. However all conventional help functions suffer from the problem that user navigation of the help information is frequently complicated and often results in the user being unable to access the relevant information, and that adaptations and improvements to the software application to which the help information relates do not translate into corresponding changes in the help information.

Some improvements to the provision of help files have been proposed. For example, United States of America Patent Application Publication US 2002/0015056 discloses a dynamic help system for a data processing device. The help system has a first generator for dynamically generating a user profile data set. This user profile data set stores, in particular with reference to a time base, help topic data sets and/or the frequency and/or the type of a user's access to utilization functions of a software program. The help system further includes a second generator for generating a user help profile data set. In this user help profile data set, at least selected help topic data sets, or program branches therefor, are stored as a function of the access data recorded in the user profile data set. Based on the user help profile data set, at least one user-specific help start-up page is dynamically generated, which allows for activating the help topic data sets associated with the user help profile data set. This system assists with providing more user-directed help information, but requires the use of user profiles and a learning process which is processor intensive. No solution is provided to the problem of adapting help files to changes in the underlying software application.

A further solution proposed by United States of America Patent Application Publication US 2004/0036715 is a multi-level user help. This document discloses a method for displaying multi-level help for an element of a computer system through creating a hierarchically organized plurality of help levels for the element in which each help level includes an associated help item. The computer system then receives a help activation command for that element from the user and responds by displaying a help item for the element of an initial help level. A user may also edit the help item or create a new help item for one of the plurality of help levels or a new help level. Additionally, each user of the system may edit and create user specific help items, and these help items may be created, edited and implemented "on the fly". However, as in many systems, user navigation of the help information is still complicated, and no solution is provided to the problem of adapting help files to changes in the underlying software application.

It is therefore an object of the invention to improve upon the known art.

SUMMARY

According to a first aspect of the invention, there is provided a method of generating a help file comprising accessing a model defining multiple objects and multiple relationships between the objects, acquiring, for an object of the model, a text file, creating a first component of the help file from the text file, acquiring, for said object of the model, data defining one or more objects connected to said object, and creating a second component of the help file from the data.

According to a second aspect of the invention, there is provided a system for generating a help file comprising a storage component arranged to store a model defining multiple objects and multiple relationships between the objects, and a processing component arranged to acquire, for an object of the model, a text file, to create a first component of the help file from the text file, to acquire, for said object of the model, data defining one or more objects connected to said object, and to create a second component of the help file from the data.

According to a third aspect of the invention, there is provided a computer program product on a computer readable medium for generating a help file, the product comprising instructions for accessing a model defining multiple objects and multiple relationships between the objects, acquiring, for an object of the model, a text file, creating a first component of the help file from the text file, acquiring, for said object of the model, data defining one or more objects connected to said object, and creating a second component of the help file from the data.

BRIEF DESCRIPTION OF THE DRAWINGS

Embodiments of the present invention will now be described, by way of example only, with reference to the accompanying drawings, in which.

DETAILED DESCRIPTION OF THE INVENTION

Owing to the invention, it is possible to provide a solution to the generation of help information (via help files) that interacts with a model to provide the correct help file to the user, which also includes content that provides links to related help files, according to the structure of the model. The invention also has the significant advantages that the help files can be generated automatically, either beforehand or on-demand, and that changes to the model will automatically propagate through to the help files. It is also the case that if the model is constructed from pre-existing objects, then the help files will be generated with no additional work.

Advantageously, object includes a link to the text file, and each object includes a link to a respective text file. If the objects within the model are provided with a link to the text file that delivers the help information for that object, then the method of generating the help files can easily locate and acquire the necessary text to use as the first component of the help file.

Preferably, the method further comprises acquiring, for the object of the model, relationship data defining one or more relationships between the object and objects connected to the object, and creating a third component of the help file from the relationship data. The generation of the help file includes links to the objects that are connected to the object for which the help file is being generated. These links can be labelled using information derived from the relationship data in the model. This improves the user experience of the help file and ensures that not only is further relevant information included in the help file, but that information is specific to the precise relationship between the present object and the connected object.

Ideally, the method further comprises repeating the acquiring of a text file and data and creating first and second components of a help file, for each object in the model. The method of generating the help file can be seen as an offline process that runs when the model is completed. A function will parse the model, acquire the text files and create a series of user help files, one each for each object in the model. The ensures a set of help files exist for the objects in the model, and it can be relied upon that the set of help files is complete and correctly represents the relationships between the objects in the model.

Advantageously, the method further comprising detecting a change in the model and regenerating the help files accordingly. The function that is generating the help files can be configured to detect any change in the underlying model, such as the addition of new objects and/or changes to the relationships between objects. This will then automatically regenerate the help files, without any need for user intervention, and once again it can be relied upon that the set of help files is complete and correctly represents the relationships between the objects in the model.

Preferably, the model defines each object as belonging to a specific class, and further comprising generating a fourth component of the help file according to the class of the object. If the model is so structured that objects within it are defined as belonging to a specific class of object, then this can be represented in the generation of the help file, which will assist user navigation of the help files, through the representation of horizontal information about the objects in the model, as well as the local connections of the object that is being represented in the help file.

Figure 1:
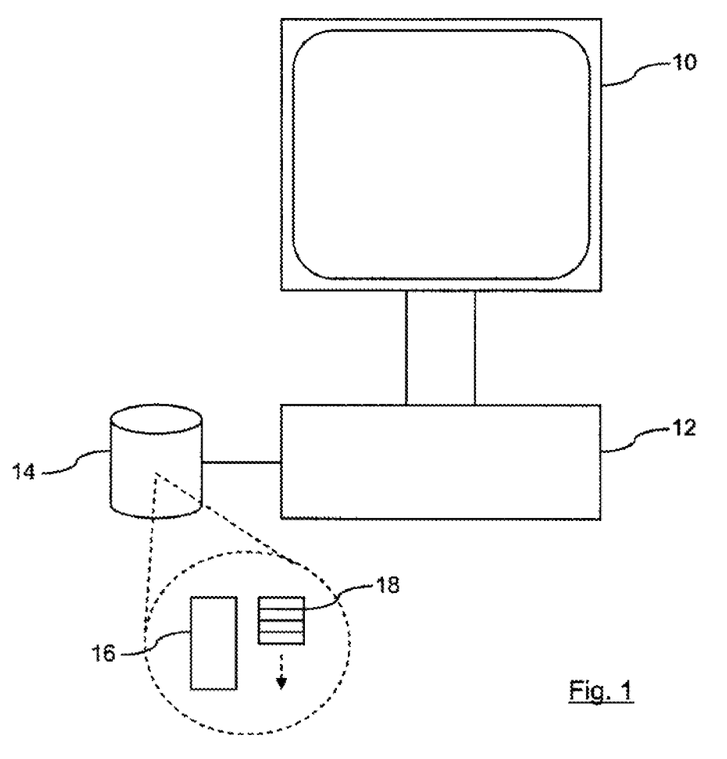
FIG. 1 is a schematic diagram of a data processing system.

FIG. 1 shows schematically a data processing system, being a standard personal computer comprising a display component 10, a processing component 12 and a storage component 14. Amongst other things, the storage component 14 is storing a model 16 and a series of help files 18. The help files 18 relate to the model 16. The configuration of the system shown in FIG. 1 is as a desktop computing environment, but could equally be a distributed computing arrangement, with the display, processing and storage functions remote from each other, and indeed the processing and storage functions could be distributed amongst separate hardware devices. The use of the expression "component" refers to the fact that the function provided by the component may be distributed across multiple devices.

The user model 16 and associated help files 18 need not be stored together, it is sufficient that the user who is accessing the model 16 is also able to access the necessary help information embodied in the help files 18 as and when required. Indeed the help files 18 may be stored remotely, and only accessed locally when a specific help file is requested. In particular, the help files could be embodied as HTML files and hosted by a remote server. This will be particularly appropriate in situation where multiple copies of the model 16 are stored at different locations, but only a single central copy of the associated help files 18 are maintained.

Figure 2:
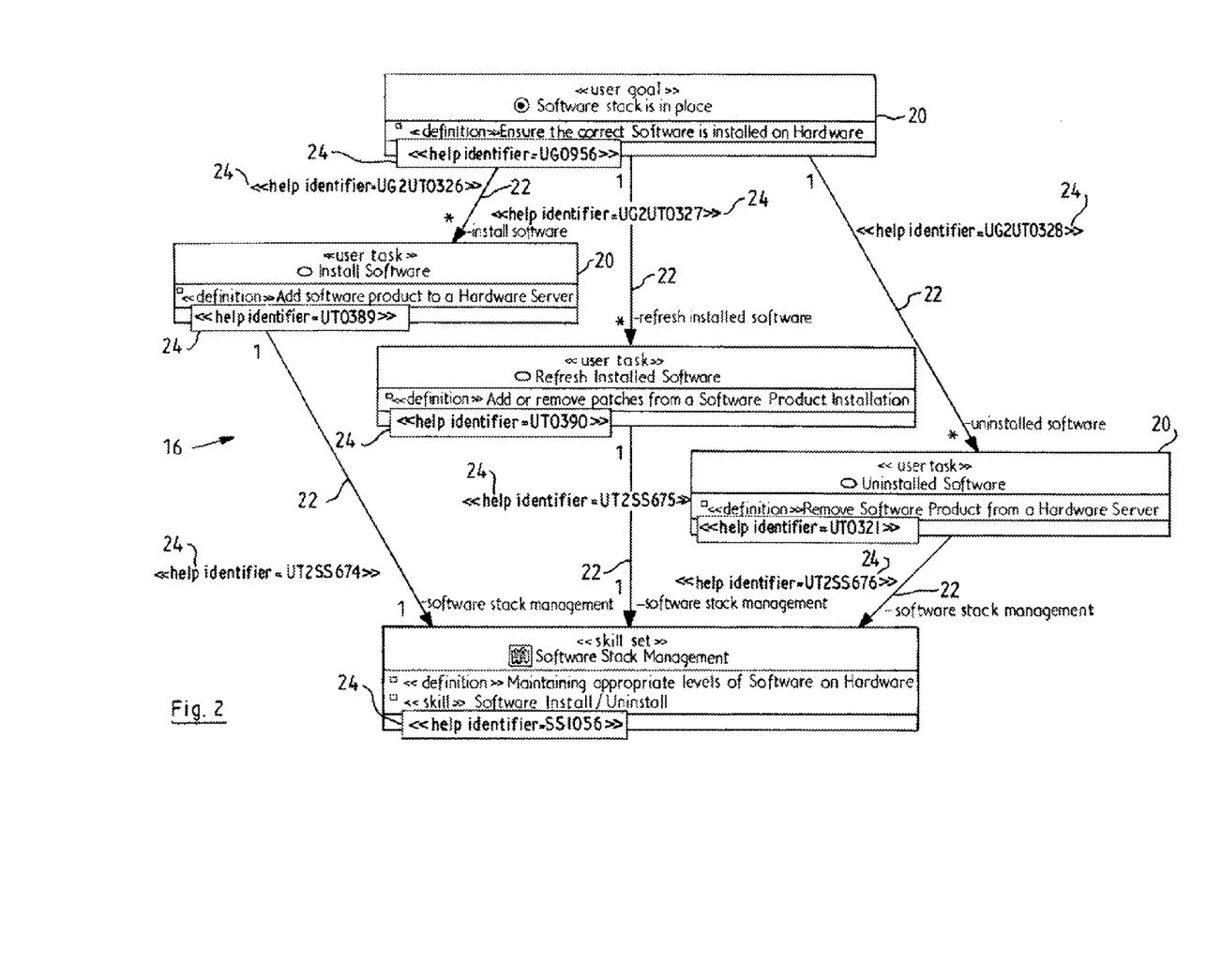
FIG. 2 is a schematic diagram of a model.

FIG. 2 shows an example of a model 16, which defines multiple objects 20 and multiple relationships 22 between the objects 20. In reality, the model 16 shown in FIG. 2 will be one portion of a much larger model. Indeed a model can have hundreds or thousands of objects and a correspondingly large number of relationships between objects. The relationships 22 can be directional, as in FIG. 2, or can simply link objects 20 together without any directional component, depending upon what is represented by the model. The type of model 16 shown in FIG. 2, being of the node and connection type, can be used to represent a very wide variety of different things. For example, a complicated piece of software could be shown by the model, or individual hardware components connected in a server network, or business units within a large organisation, or, as shown in FIG. 2, a user model that links business roles and their goals and tasks and so on.

In some technology systems, specific middleware requires users playing different roles to operate it. To support this, it is possible to define a common set of roles for the users so that there can be an increase in the consistency in our designs when it comes to supporting each role (see http://www.ogc.gov.uk/User_roles_in_the_toolkit_business_manager.asp). From these roles, it is possible to build a user model that links these role definitions to concepts such as user goals, skill sets, user tasks, user objects and user artefacts. New extensions for the user modelling method of skill set and user artefact and using these enhanced models, introduced the idea that this user model can become the control model of a product's user interface.

A user model is a network of related concepts. One example of such a model defines the concepts as follows:
A User Role describes responsibilities of a job role.
A Skill Set describes a related set of skills that could form part of a course, book, or be expected from a profession or discipline.
A User Goal describes the state a user role wishes to achieve (why they do what they do).
A User Task describes a piece of work that has to be done.
A User Object describes a concept that a user must understand.
A User Artefact is a physical asset that the user creates or works with.

These concepts are linked together using the following types of relationships:
A User Role links to the User Goals that are relevant to the role.

A User Goal links to other User Goals that are its sub-goals.

A User Goal links to the User Tasks that are executed to achieve the User Goals.

A User Role links to the Skill Sets that a person performing that role should have.

A User Task links to other User Tasks that are subtasks of it.

A User Task links to the Skill Sets that a person needs to perform the task.

A User Task links to the User Objects and User Artefacts that it manipulates during its operation.

A Skill Set links to the User Objects and User Artefacts that are understood by someone with that Skillset knowledge.

A Skill Set links to other Skill Sets that are pre-requisite to understanding the Skill Set.

User Models can be used to specify the requirements for a User Interface. They can be written in UML, and in this case they are stored in XML which means they are readable by a program. It is advantageous to provide an annotated User Model as a help system. It is possible to annotate a user model with help information. Examples of the type of information are shown below:

Annotating User Goals with information about the value of achieving the goal, expected results, measures and targets. Also the order in which the User Task should be performed.

Annotating User Tasks with information on how to perform a task.

Annotating User Objects and User Artefacts with background information on the concepts/artefacts they represent.

Annotating relationships with information on why the relationship is important and when it is relevant.

An annotated user model can provide a help system. The annotations are the help text, the structure of the user model is used to provide the navigation model allowing the reader to move between the annotations, and the meta-model elements (objects in the model belonging to the classes: User Role, User Goal, Skill Set, User Task, User Object and User Artefact) provide the menu lists to act as entry points into the help. Therefore a user can select "User Tasks" and see a list of all of the User Tasks in the model. By clicking on a particular task, the annotation associated with the task is shown. Also displayed are links to the appropriate Skill Sets for this task and links to the User Objects and User Artefacts the task involves. Following these links displays the annotation for the selected element along with the links to its related elements. This approach creates a well structured help system that ensures information is logically organized, complete and link together and which is structured according to the needs of the users.

The model and the associated help files are used to provide a context-specific help in a User Interface. If a User Interface (UI) is designed from a user model and the relationships between the elements in the user model and a section of code in the UI are maintained then when a user requests help from a particular point in the code, it can extract the relevant annotation from the user model. This can be extended to provide personalized context-specific help in a User Interface. A user model can be used to configure a user interface so it is specific to a particular user role. If the user model is annotated as described above (and in more detail below) then a user interface that implements this personalisation can provide a help system that only includes information that is relevant to the user's User Roles. The result of this is to remove information that is irrelevant and confusing.

The user model 16 shown in FIG. 2 is described in UML. In products produced using this model, it is desirable to offer help systems in multiple languages. So this embodiment assumes a UML-based User Model and maintains help information in multiple languages. If only one language was needed then the annotations could be stored directly in the UML model file. However, this may make the UML model file unwieldy for large user models.

The model 16 of FIG. 2 is annotated. The annotating of the user model 16 means that each object 20 and relationship 22 in the user model 16 is given a new attribute with a stereotype of «help identifier». This stereotype has a property that stores the string identifier of the help annotation. The attribute is a link 24 to the text file. In addition there is a text file (an XML file) that then stores the help text for each annotation. In relation to the model 16 of FIG. 2, the XML files that provide the help text could be constructed as follows:

```
<helpfile language="En_US" usermodel="General Administration.emx">
:
<helptext identifer="UG0956">
<title>User Goal: Software Stack is in place</title>
<description>For a system to operate correctly, the appropriate level of software must be
loaded onto each Hardware Server (node). Much of this software will be provided by Software
Products. Software Products are loaded onto a Hardware Server through a Install Software
task, They are removed from the Hardware Server using an Uninstall Software task and fixes
are added to a Software Product using the Refresh Installed Software tasks.</description>
    </helptext>
    <helptext identifier="UG2UT0326">
<title>Install Software</title >
<description>Add a Software Product to a Hardware Server.</descripton >
    </helptext>
    <helptext identifier="UG2UT0327">
<title>Refresh Installed Software</title>
<description>Add or remove patches for a Software Product to a Hardware
Server.</description>
    </helptext>
    <helptext identifier="UG2UT0328">
<title>Uninstall Software</title>
<description>Remove a Software Product from a Hardware Server.</description>
    </helptext>
    <helptext identifier="UT0389"> . . . </helptext>
```

-continued

```
<helptext identifier="UT0390"> . . . </helptext>
<helptext identifier="UT0321"> . . . </helptext>
    :
    :
</helpfile>
```

Figure 3:
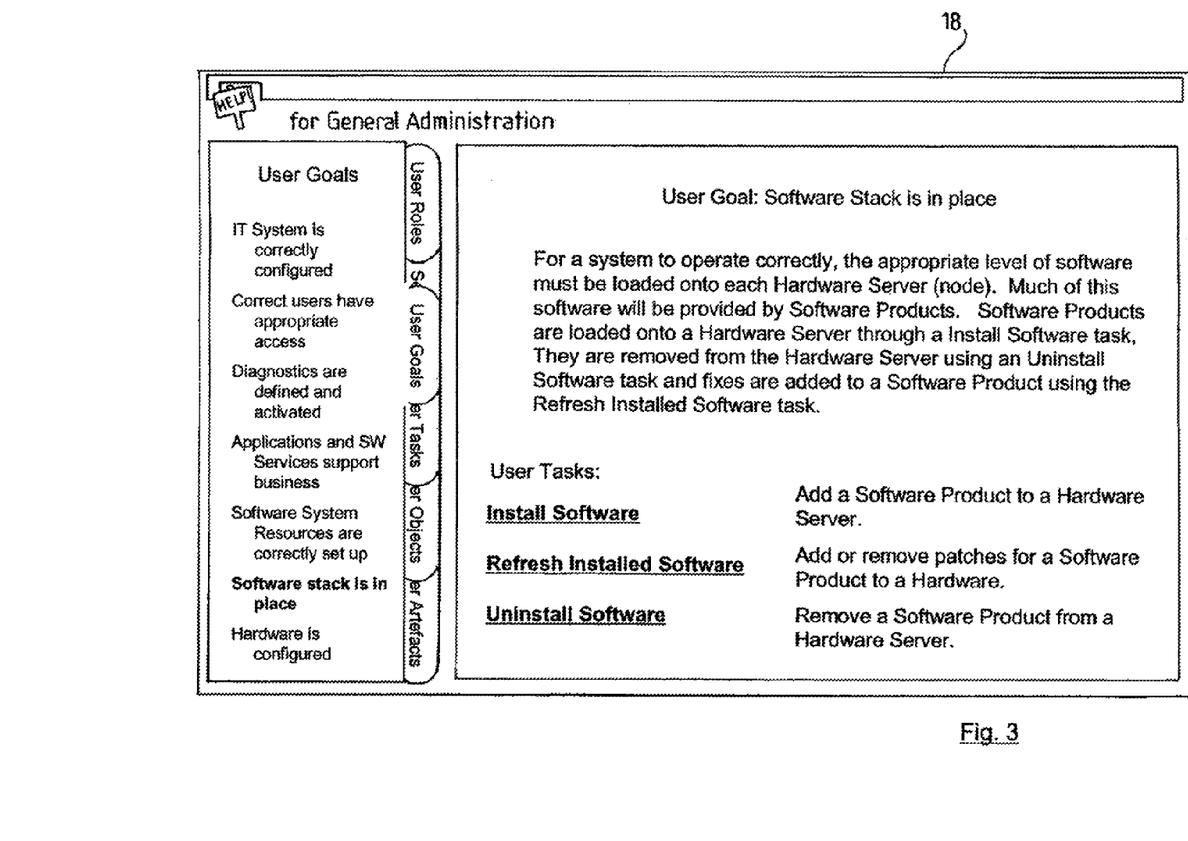
FIG. 3 is a schematic diagram of a help file.

The program that displays the help information reads the UML model to determine the structure of the text in the help systems and it reads the help test XML files that contain help information in the correct language. An example of the resulting help file 18 is shown in FIG. 3. In this example, the help file 18 is an HTML file, and the view of the file 18 shown in FIG. 3 is the file 18 as viewed with a suitable browser. It should be appreciated that the help file 18 could be compiled in a wide variety of different formats, and then interpreted, when it is viewed by the user, in an equally large number of different ways.

The help file 18 shown in FIG. 3 is for the object 20 of FIG. 2 entitled "user goal: software stack in place", illustrated at the top of the Figure. This help file 18 will be shown to the user when they request help in respect of this object 20. The actual mechanism by which the user requests the help information is not material, but may be via the medium of right-clicking on the object 20 when it is shown to the user, as they view the model 16 (or a portion of the model 16). The help file 18 may be generated on the fly, as and when it is requested, or may be already in existence when the request for help is made. In this latter case, all of the necessary help files 18 for the specific user model 16 have been pre-generated prior to the model 16 being made available to the end users (once the necessary development and implementation phases have been completed for the specific model 16).

Figure 4:
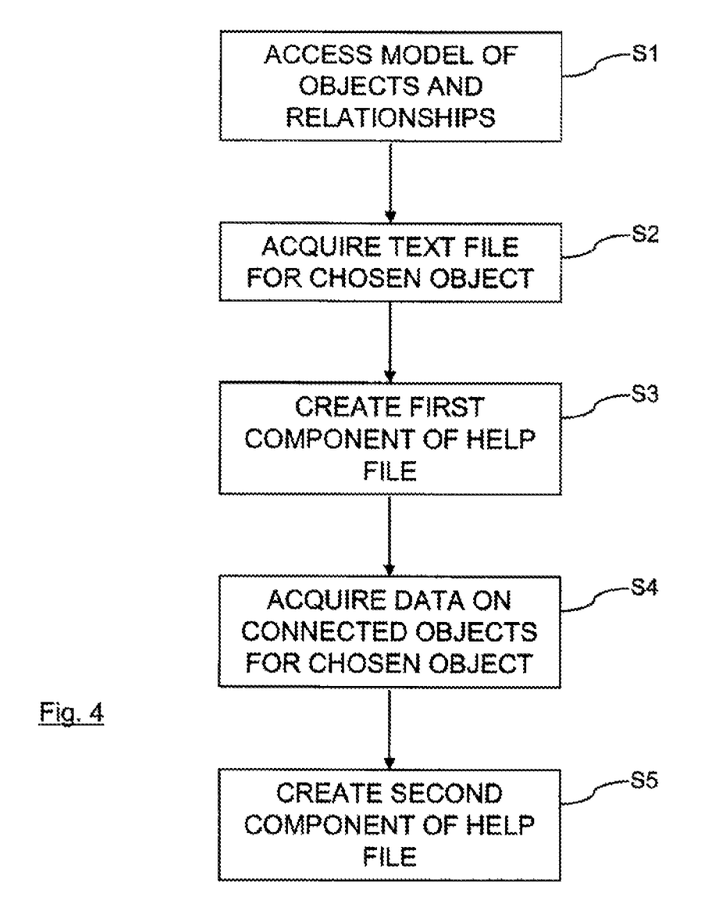
FIG. 4 is a flowchart of a method of generating a help file.

The process that is carried out to generate the help file 18 is summarised in FIG. 4. The method of generating the help file 18 comprises, firstly at step S1, accessing the model 16 that is defining the multiple objects 20 and multiple relationships 22 between the objects 20. At step S2, the process continues by acquiring, for an object 20 of the model 16, a text file. It is assumed that the user has selected an object 20 in the model 16, about which they wish to receive some help information. This selection could be direct, i.e. the user is directly viewing/accessing the model 16 and selects an object 20, or indirect, i.e. the user is working with something that is represented by them model 16 and makes a selection in this environment that is translated into a selection of an object 20. In one embodiment, the object 20 includes a link 24 to the text file (such as an XML).

The next step is step S3 of creating a first component of the help file 18 from the text file. The processing component 12 (of FIG. 1) is arranged to parse the text file in an appropriate manner and to acquire the necessary text (which may be the whole file) for use in the help file 18. The processing component 12 is effectively creating an HTML file which will be the help file 18 for the specific selected object 20.

Once the first component of the help file 18 has been created, then at step S4 the process continues by acquiring, for the object 20 of the model 16, data defining one or more objects 20 connected to the selected object 20. In FIG. 2, it can be seen that the object "user goal: software stack in place", has three further objects 20 directly connected to it. The processing component 12 is arranged to access the model 20 and acquire the data about the connected objects 20. Finally, at step S5 the process terminates by creating a second component of the help file 18 from this data. This second component comprises links within the help file 18 to other different help files.

Figure 5:
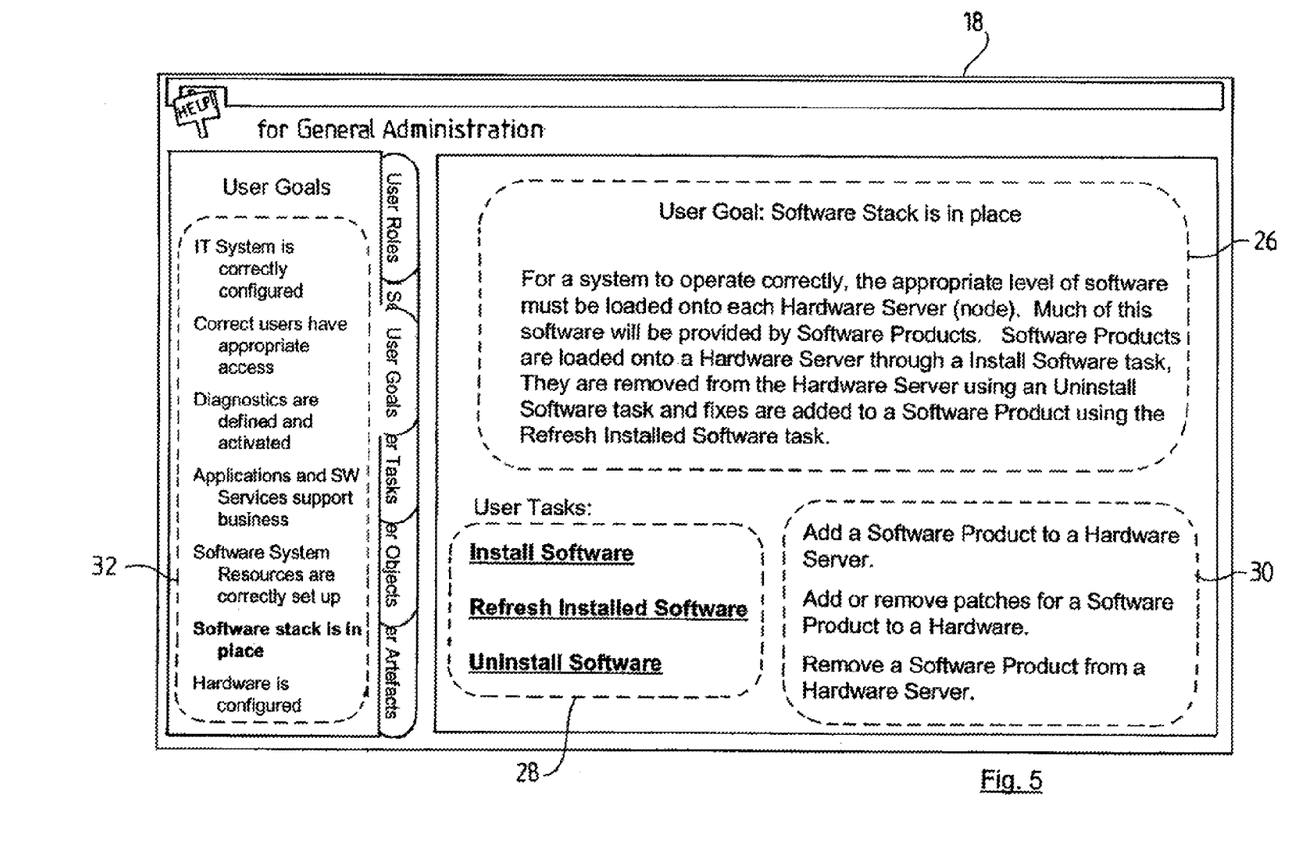
FIG. 5 is a further schematic diagram of the help file of FIG. 3.

FIG. 5 shows the same view of the help file 18 of FIG. 3, but this time marked to show the different components generated by the processing component 12, when the help file 18 is created. The first component is the component 26, which is taken from the text file that relates to the specific object 20 which has been selected by the user.

The second component is the component 28, which is taken from the data acquired when accessing the model 16 to determine those objects 20 that are linked to the selected object 20. This component 28 provides links to other help files 18, as the help files 18 can be constructed as interlinked HTML pages. As can be seen from the image of the model 16 in FIG. 2, the object 20 "software stack in place" is connected to three other objects 20 "install software", "refresh install software" and "uninstall software". These three objects 20 are represented in the second component 28 as links to their respective help files 18.

As can be seen, the invention delivers the advantage that this portion of the help file is generated automatically, linking the help files 18 together in a logical and easily navigable manner. It is also the case that any changes in the structure of the underlying model will be reflected in changes in the corresponding help files 18, without the need for any administrator intervention. The processor 12 is simply parsing the model 16 in a predetermined fashion and representing the connected objects 20 in the component 28.

The processor 12 can also be configured to acquire, for the selected object 20 of the model 16, relationship data defining one or more relationships between the object 20 and objects 20 connected to selected object 20, and to create a third component 30 of the help file 18 from the relationship data. The links embodied in the component 28 can have additional information provided in the third component 30, which is harvested from the model 16. This is obtained from the relationships 22 that connect the selected object 20 to the other objects 20.

Figure 6:
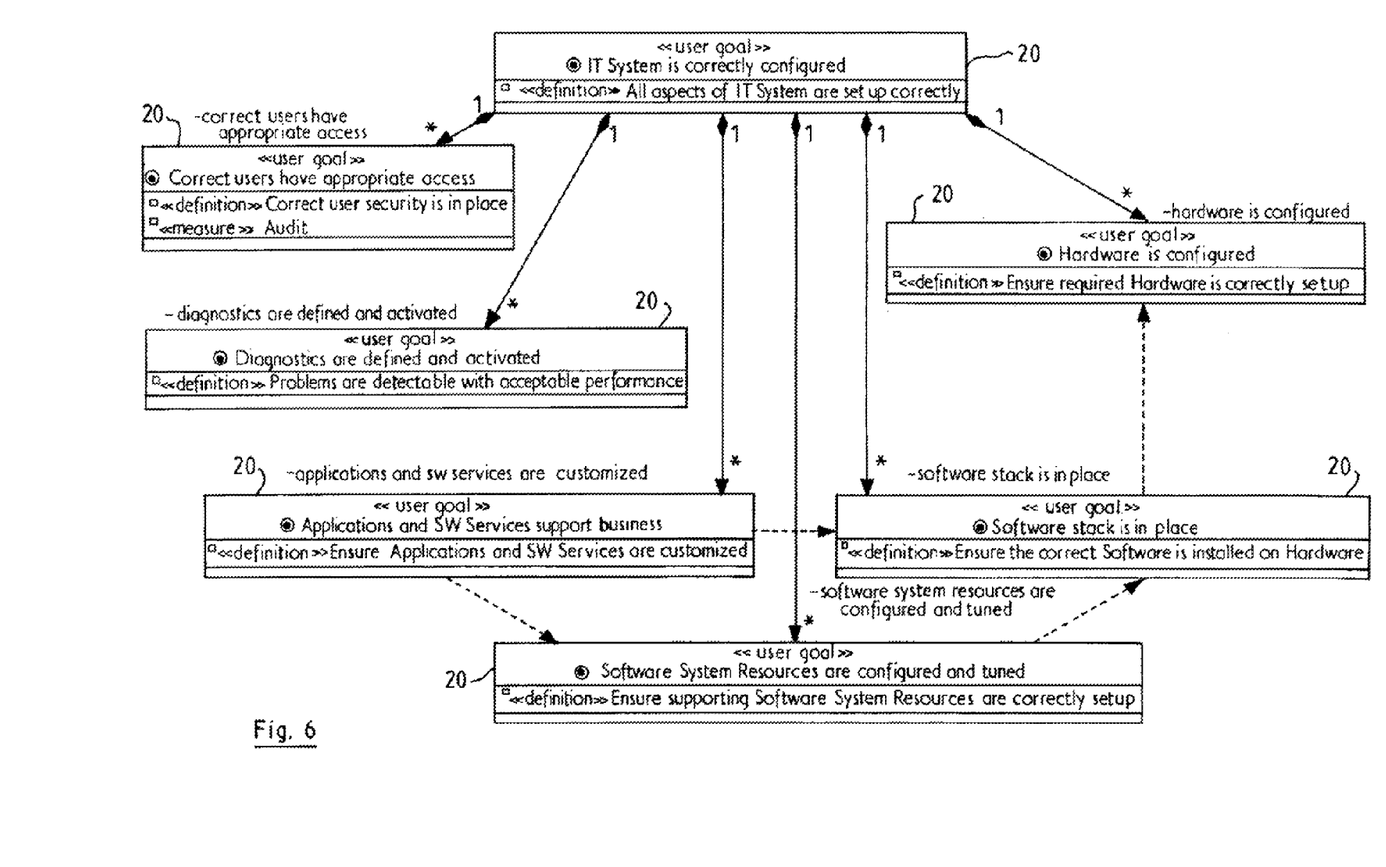
FIG. 6 is a further schematic diagram of the model of FIG. 2.

The model 16 defines each object 20 as belonging to a specific class, and the processor 12 can be further configured to generate a fourth component of the help file 18 according to the class of the object 20. Assuming the user model shows the goals according to FIG. 6, and the user selects the "Software Stack is in place" goal, the fourth component of the help system would look like as shown in FIG. 5, component 32, which shows other objects 20 that are defined in the model 16 as the same class as those of the selected object "software stack is in place". This allows the user to navigate the help file system in a horizontal manner, as well through the links in the component 28 to the objects 20 that are connected to the currently selected object 20.

What is claimed is:
1. A method for generating a context-specific help file using a computing device, the method comprising:
   causing the computing device to access a user model that models a software application related process, wherein the user model represents a network of related concepts, wherein the user model defines a plurality of objects and a plurality of linked relationships between the plurality of objects, wherein the user model provides a navigation model for a user to move between annotations and meta-model elements in a user interface, wherein the user model specifies requirements for the user interface, wherein the plurality of objects provide a plurality of menu lists as entry points to the context-specific help file, and wherein the software application related process is any of an install software task, an uninstall software task, or a refresh installed software task;

causing the computing device to select a first object of the user model by the user in the user interface;

causing the computing device to receive a text file corresponding with the first object;

causing the computing device to create a first component of the context-specific help file from the text file;

causing the computing device to select all additional objects of the user model not selected by the user and corresponding with the first component and to present at least one additional object to the user, the at least one additional object connected with the first object as defined by the user model;

causing the computing device to give the at least one additional objects a new attribute with a stereotype of «help identifier»; and causing the computing device to create at least one additional component of the context-specific help file corresponding with the at least one additional object, wherein the at least one additional component comprises at least a link to a respective text file of the at least one additional object connected to the first object.

2. The method of claim 1, further comprising:
detecting an underlying structural change to the user model; and
automatically regenerating the context-specific help file to incorporate the underlying structural change without user intervention.

3. The method of claim 1, wherein the at least one additional component is selected from the group consisting of: a link to the at least one additional object, the relationship between the at least one additional object and the first object, and a class of the at least one additional object.

4. The method of claim 3 wherein the class is selected from the group consisting of: a user role, a user goal, a skill set, a user task, a user object, and a user artifact.

5. The method of claim 1, wherein the first component includes a link to the text file.

6. The method of claim 1, wherein the plurality of linked relationships comprise directional relationships and non-directional relationships.

7. The method of claim 1, wherein the user model is described in a unified modeling language (UML) format.

8. The method of claim 1, wherein the first component is an HTML file.

9. A computer program product for generating a help file, the computer program product comprising:
a non-transitory computer readable medium;
first program instructions for accessing a user model that models a software application related process, wherein the user model represents a network of related concepts, wherein the user model defines a plurality of objects and a plurality of linked relationships between the plurality of objects, wherein the user model provides a navigation model for a user to move between annotations and meta-model elements in a user interface, wherein the user model specifies requirements for the user interface, wherein the plurality of objects provide a plurality of menu lists as entry points to the context-specific help file and wherein the software application related process is any of an install software task, an uninstall software task, or a refresh installed software task;

second program instructions for selecting a first object of the user model by the user in the user interface;

third program instructions for receiving a text file corresponding with the first object;

fourth program instructions for creating a first component of the context-specific help file from the text file;

fifth program instructions for selecting select all additional objects of the user model not selected by the user and corresponding with the first component and to present at least one additional object to the user, the at least one additional object connected with the first object as defined by the user model;

ninth program instructions for giving the at least one additional objects a new attribute with a stereotype of «help identifier»; and sixth program instructions for creating at least one additional component of the context-specific help file corresponding with the at least one additional object, wherein the at least one additional component comprises at least a link to a respective text file of the at least one additional object connected to the first object.

10. The computer program of claim 9, further comprising:
seventh program instructions for detecting an underlying structural change to the user model; and
eight program instructions for automatically regenerating the context-specific help file to incorporate the underlying structural change without user intervention.

11. The computer program of claim 9, wherein the at least one additional component is selected from the group consisting of: a link to the at least one additional object, the relationship between the at least one additional object and the first object, and a class of the at least one additional object.

12. The computer program of claim 11 wherein the class is selected from the group consisting of: a user role, a user goal, a skill set, a user task, a user object, and a user artifact.

13. The computer program of claim 9, wherein the first component includes a link to the text file.

14. The computer program of claim 9, wherein the plurality of linked relationships comprise directional relationships and non-directional relationships.

15. The computer program of claim 9, wherein the user model is described in a unified modeling language (UML) format.

16. The computer program of claim 9, wherein the first component is an HTML file.

17. A context specific help file embodied in a computer readable medium comprising:
a non-transitory computer readable medium;
a first component, the first component including a text file received from a first object of a user model that models a software application related process selected by a user, wherein the user model represents a network of related concepts, wherein the user model defines a plurality of objects and a plurality of linked relationships between the plurality of objects wherein the user model provides a navigation model for a user to move between annotations and meta-model elements in a user interface, wherein the user model specifies requirements for the user interface, wherein the plurality of objects provide a plurality of menu lists as entry points to the context-specific help file and wherein the software application related process is any of an install software task, an uninstall software task, or a refresh installed software task;

all additional objects of the user model not selected by the user and corresponding with the first component and to present at least one additional object to the user, the at least one additional object connected with the first object as defined by the user model and corresponding with the first component, and wherein the at least one additional component comprises at least a link to a respective text file of the at least one additional object connected to the first object.

18. The context-specific help file of claim 17, wherein the context-specific help file is configured to automatically regenerate in response to a detected underlying structural change in the user model without user intervention.

19. The context-specific help file of claim 17, wherein the at least one additional component is selected from the group consisting of: a link to the at least one additional object, the relationship between the at least one additional object and the first object, and a class of the at least one additional object.

20. The context-specific help file of claim 17, wherein the first component further includes a link to the text file.

21. The context-specific help file of claim 17, wherein the plurality of linked relationships comprise directional relationships and non-directional relationships.

22. A system for generating a context-specific help file comprising:

a storage component configured to store a user model that models a software application related process and the context-specific help file, wherein the user model represents a network of related concepts, wherein the user model defines a plurality of objects a plurality of linked relationships between the plurality of objects wherein the user model provides a navigation model for a user to move between annotations and meta-model elements in a user interface, wherein the user model specifies requirements for a user interface, wherein the plurality of objects provide a plurality of menu lists as entry points to the context-specific help file, and wherein the software application related process is any of an install software task, an uninstall software task, or a refresh installed software task; and a processing component configured for generating the context-specific help file by accessing the user model, the generating comprising, accessing the user model, selecting a first object of the user model by a user in the user interface, receiving a text file corresponding with the first object, creating a first component of the context-specific help file from the text file, selecting all additional objects of the user model not selected by the user and corresponding with the first component and to present at least one additional object to the user, the at least one additional object connected with the first object as defined by the user model;

giving the at least one additional objects a new attribute with a stereotype of «help identifier»; and creating at least one additional component of the context-specific help file corresponding with the at least one additional object, wherein the at least one additional component comprises at least a link to a respective text file of the at least one additional object connected to the first object.

23. The system of claim 22, wherein the processing component is further configured for:

detecting an underlying structural change to the user model; and automatically regenerating the context-specific help file to incorporate the underlying structural change without user intervention.

24. The system of claim 22, wherein the at least one additional component is selected from the group consisting of: a link to the at least one additional object, the relationship between the at least one additional object and the first object, and a class of the at least one additional object.

* * * * *